UNITED STATES PATENT OFFICE.

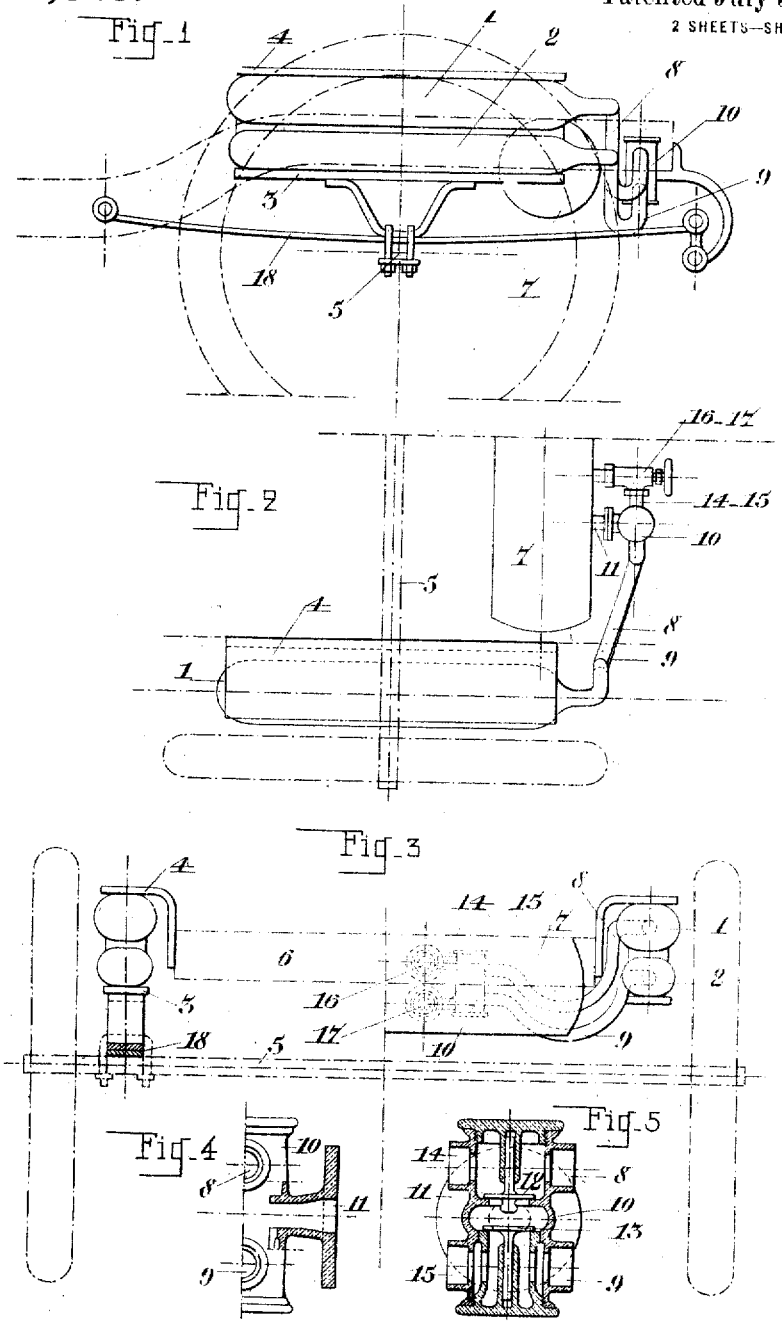

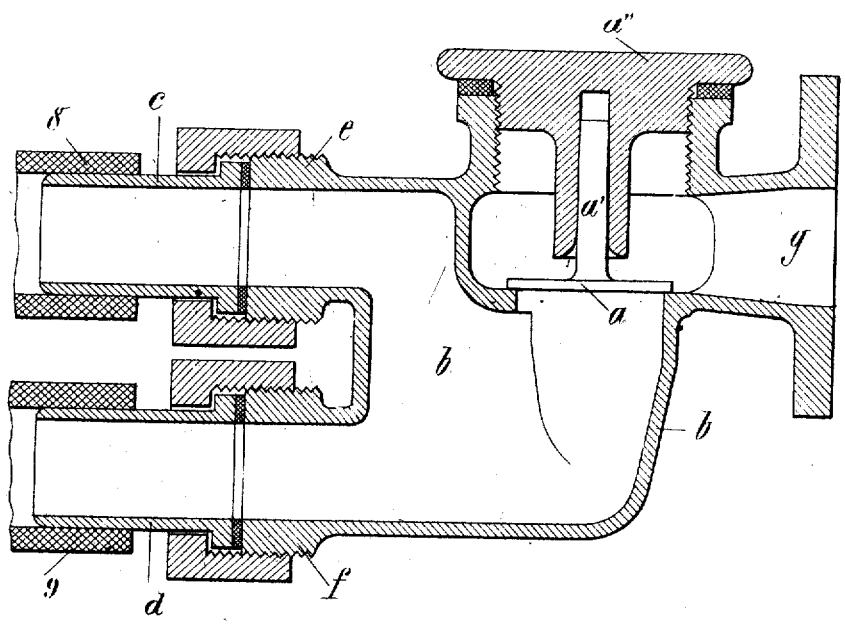

RAOUL BERNAT, OF BORDEAUX, FRANCE.

PNEUMATIC SPRING SYSTEM.

1,273,813.  Specification of Letters Patent.  Patented July 30, 1918.

Application filed July 29, 1913. Serial No. 781,801.

*To all whom it may concern:*

Be it known that I, RAOUL BERNAT, citizen of the Republic of France, residing at Bordeaux, France, have invented new and useful Improved Pneumatic Spring Systems, of which the following is a specification.

The present invention relates to a pneumatic spring system in which the compression and expansion take place freely and rapidly while the return to the normal position is braked, this arrangement being adapted to replace or to assist in all the applications of the actual springs whether same be flat or spiral or of any other shape.

The system in question comprises the combination of the following elements:

Two deformable superposed containers containing air under pressure and arranged between the two elements, the relative displacement of which are to be damped; a reservoir constituting the brake which may be common to or connected to each of the said containers; and a distributing device which connects the said containers to the corresponding reservoir constituting the brake, in such a manner as to allow of the free passage of air from one of the containers to the reservoir and of air contained in the said reservoir to the other container; the passage of the air in the opposite direction, that is, the return into the container from which it has been expelled, being arranged to take place through branch conduits which are provided with regulable closing devices or with any other suitable means which allow the speed of the passage of air to be reduced and consequently permit of obtaining a braked return which constitutes an essential feature of the system in question.

In order that my invention may be thoroughly understood I have hereunto appended an explanatory sheet of drawings wherein by way of example Figure 1 illustrates a side elevation of the rear part of a vehicle to which the system in question is applied, and Fig. 2 one half of the plan corresponding to Fig. 1. Fig. 3 is a rear elevation and partly a section along an axle tree of the vehicle to which the device is applied. Figs. 4 and 5 are detail views representing one construction of the distributing device above mentioned. Fig. 6 is a section of modified construction of pneumatic spring system.

The same reference letters indicate the same elements in the various figures of the drawings.

In its entirety the system in question comprises two deformable containers 1, 2 which are superposed and are arranged between two parts 3, 4 which are secured to the axle 5 and to the chassis 6 of the vehicle respectively. These containers are preferably arranged longitudinally with regard to the axis of the vehicle.

7 designates a reservoir constituting the brake to which the containers 1 and 2 are connected by means of pipes 8 and 9 respectively, these pipes opening into a distributing device 10 which is also in communication with the reservoir 7 through a pipe 11. The interior of the distributing device 10 is divided into two chambers which are separated from each other by valves 12, 13. These valves are arranged to open automatically and permit the free passage of the air from the reservoir 7 to the container 1 and from the container 2 to the said reservoir, while preventing any circulation of the air through the pipes 8 and 9 in the opposite directions.

Each of the said two chambers is connected by conduits 14 and 15 respectively to the reservoir 7, regulable closing devices 16, 17 being arranged in the said conduits in such a manner as to enable the section of the air passage and consequently also the rate of the air flow therethrough to be regulated as desired.

The containers 1 and 2 are therefore in communication with the reservoir 7 through the branch conduits 14 and 15. The regulable section of these branch pipes allows the air, the return of which is retarded by the said closing devices to pass directly from the brake reservoir to the deformable containers, the retarded return producing the braking of the return movement to the normal position of the elements of the system in question.

It should be observed that the retarded return of the air, that is, the return of the air into the container from which it has been expelled, may be obtained without making use of branch pipes provided with regulable closing devices as above mentioned; the valves 12 and 13 of the distributing devices being simply provided with suitable perforations.

If the system in question is to be applied to the suspension of vehicles, which application has been chosen in this specification by way of example, the connection between the axle and the chassis of the vehicle is obtained by means of a spring 18, the force of which is too small to insure the suspension of the vehicle and which is merely intended to maintain the shaft and the chassis in their respective planes.

The operation of the system according to the present invention is as follows:

Supposing, while the apparatus is filled with air at a suitable pressure, the wheel of the vehicle runs against an obstacle, the air contained in the pocket or container 2 will be instantaneously forced into the brake reservoir 7 through the flexible tube 9 while the valve 13 is raised. At the same time another portion of the air in the two pockets or containers is forced into that same reservoir through the pipe system 14—15 and the closing devices 16—17, the opening of which has been regulated as taught by experience, which opening in all cases is much smaller than the opening in the valve 13.

After the obstacle has been passed the air which had suddenly been forced out of the pocket or container 2 into the reservoir 7 reënters the container at reduced speed, through the reduced opening of the closing device. Synchronism of the vibrations of the spring 18 cannot occur because outlet and inlet of the air which guide the movement of the spring is produced during a period of time which is entirely different. Thus the chassis cannot be subjected to swinging movements.

Yet this construction, that is to say the construction wherein a valve opens toward the reservoir is useful only when a projecting obstacle is encountered and in the case of a depression, the chassis will fall upon the spring.

The addition of a second pocket or container 1, of a second valve 12 and a closing device, has for object to remedy that defect.

It will be seen that when a depression is met, the compressed air contained in the reservoir 7 immediately enters the container 1 while raising the valve 12.

At the same time a certain quantity of supplementary air reënters the two containers through the openings in the closing devices 16—17 yet at reduced speed and consequently without causing swinging movements of the chassis.

Under such conditions the chassis cannot drop upon the spring and the suspension is efficient whether a depression or a projecting obstacle be passed, without it being possible that synchronism of the vibrations of the spring 18 can occur.

It may be stated here that the closing devices 16 and 17 might be suppressed and replaced by perforations in the valves 12 and 13. Closing devices however are more efficient because they can be regulated at any moment while in order to modify the return opening when such return occurs through the perforation of the valves the latter must be changed.

Thus, the arrangement, upon the pipes connecting the deformable containers with the brake reservoir, of valves of a large cross section opening in inverted direction and of regulable closing devices having reduced cross sections, constitute one of the essential features of the system. This arrangement is of the highest importance as it permits the system in question to be efficient when a vehicle equipped therewith meets a projecting obstacle as when it meets a depression in the road.

It should also be observed that with the system in question the pressure to which the pneumatic elements constituting the same are inflated may be varied, and it is, therefore, easy to make this pressure and consequently also the strength of the whole system proportionate to the load to be carried and to the forces which it may have to sustain.

The air supply may be either intermittent or continuous and may be obtained by means of a small pump; in this case an adjustable admission valve allows of the pressure at any desired degree being automatically maintained.

The containers 1 and 2 may of course be of various shapes and lengths and constructions and they may also instead of being connected to a common brake reservoir, be provided separately with a corresponding reservoir so that a different pressure may be used in each of the two containers.

The system forming the subject of the present invention may of course be used in all cases in which it is necessary to absorb the shocks which take place between any parts, for instance in the construction of cushions, seats, saddles, cycles etc. and in general in the construction of any kind of elastic mattresses or buffers.

As soon as the vehicle travels in a straight line, the excess of air forced into the said containers is expelled by means of a safety valve which preferably may be placed upon the brake reservoir.

Another improvement consists in combining the deformable containers of the said system and the ordinary flat springs of the vehicle for the purpose of braking or retarding the action of the latter, the said retardation or braking being effected by the aid of a single perforated valve which is common to the deformable containers corresponding to the same pressure. This combination enables the load due to the suspension of the vehicle to be distributed between the ordinary springs and the pneumatic spring system the principal action of the pneumatic spring system consisting in retarding the undesired oscillations of the ordinary springs. In this combination the ordinary springs support the larger part of the load carried, without, however, being sufficiently strong for carrying the whole weight of the vehicle. The force of the spring is, therefore, so limited that it cannot produce any rebounds; the supplementary force being supplied by the pneumatic spring which serves mainly for braking or retarding the action of the ordinary springs.

For this purpose the deformable containers which may be in the form of cylinders or pneumatic pockets, are connected to the brake reservoir preferably through a single valve $a$ (Fig. 6) which is arranged within a valve casing $b$. The stem or spindle of the valve $a$ is conveniently guided in a cover $a''$ screwed into the casing. Into the latter open the two pipes 8 and 9 mentioned above, these pipes being connected to the casing $b$ by means of connection pieces $c$, $d$ which are fixed to the parts $e$ and $f$ of the casing in an air-tight manner.

In the case of this modified arrangement, it will be seen that when a vehicle provided with that device meets an obstacle it rises suddenly and at once forces out the air held in the two containers which, after having raised the valve $a$ passes through the opening $g$ into the brake reservoir. The valve $a$ is provided with a return opening which permits the air to reënter the container at a greatly reduced speed. As the air moves very rapidly when being forced out and at a reduced speed when reëntering the containers, no swinging motion of the chassis can occur.

When on the contrary the vehicle meets a depression in the road the chassis drops with the axle but, as the layer of air is very thick no violent shock is produced.

The adoption of the double container therefore has the advantage that also in that case it lessens considerably the violence of the shock that would be produced when the wheel meets a depression, in the case where the suspension system would comprise only one solitary container.

With regard to the use of two superposed pockets or deformable containers, it should be noted that in the construction of a pneumatic suspension, it is essential to have a layer of air that is as thick as possible in order to pass over the obstacles met on the road. It frequently happens that the compression of the suspension amounts to from 7 to 8 centimeters and consequently it is necessary therefore that the pneumatic containers when charged be at least 12 centimeters high.

On the other hand, however, the pneumatic containers should not be too wide because otherwise they would come in contact with the wheels and the chassis of the vehicle. The greatest width that may be given them is only 18 centimeters, which when the suspension is under load, corresponds to a height of 6 centimeters, keeping in mind the proportion that must exist between the width and the height of the containers.

Hence one of the characteristic features of the system which forms the subject matter of the present invention consists especially in the superposition of two pockets in order to obtain a layer of compressed air 12 centimeters high without lengthening the axle, whereas if only one container is used, it would be necessary in order to obtain the same height of 12 centimeters to lengthen the axle 36 centimeters, 18 at each end, which could not be done.

Summing up it will be seen that the use of two superposed containers alone, permits of passing over obstacles twice the size of those that could be passed over if there were only one container and that that can be accomplished without widening the chassis of the vehicle.

It will be seen from the foregoing that the above described improved system enables a vehicle to be suspended by means of two devices of an entirely different nature, namely, by means of the elasticity of steel and by means of compressed air. By this system the pendulum movements which often take place when the ordinary steel springs only are used are suppressed and the suspension of the vehicle is therefore very steady as the stroke of the spring device is reduced to a minimum.

In addition, the small vibrations which are inherent and unavoidable with metallic springs, are not transmitted to the chassis of the vehicle since the cushion or mattress of compressed air constituted by the deformable containers entirely absorbs these vibrations.

Finally the dimensions of the deformable containers may be considerably reduced since these containers serve only as additional springs. It may be observed that the spring arrangement above described may be successfully applied as a shock absorber for aeroplanes or balloons of any kind, in which case it is preferable to make the brake reservoir 7 of a light material such as for instance caoutchouc or the like.

I claim as my invention:

1. In a pneumatic spring system, the combination of a pair of yieldably-connected relatively-movable elements to be braked; a pair of sack-like containers disposed, one above the other, between said elements; a reservoir; a distributing device communicating with said reservoir and separately with said containers; and valve means for permitting free passage of air in one direction and retarded passage of air in the other direction, said valve means comprising a double valve having a large opening directed toward one of the containers and another opening directed toward the reservoir.

2. In a pneumatic spring system, the combination of a pair of yieldably connected relatively movable elements to be braked; a reservoir, a pair of superposed deformable containers containing air under pressure and disposed between said elements; a distributing device communicating with said reservoir and containers; check valves in said device and permittting free passage of air from one container into the reservoir and from said reservoir to the other container; and means permitting retarded passage in opposite directions to said free passage.

3. In a pneumatic spring system, the combination of a pair of yieldably connected relatively movable elements to be braked; a reservoir; a pair of superposed deformable containers containing air under pressure and disposed between said elements; a distributing device communicating with said reservoir and containers; check valves in said device and permitting free passage of air from one container into the reservoir and from said reservoir to the other container; and adjustable means permitting adjustably retarded passage in opposite directions to said free passage.

4. In a pneumatic spring system, the combination of a pair of yieldably connected relatively movable elements to be braked; a reservoir; a pair of superposed deformable containers containing air under pressure and disposed between said elements; a distributing device communicating with said reservoir and containers; check valves in said device and permitting free passage of air from the lower container to the reservoir and from the reservoir to the upper container; and adjustable means for permitting retarded passage of air from the upper container to the reservoir and the reservoir to the lower container.

In testimony whereof I have signed my name to this specification in the presence of two subscribing witnesses.

RAOUL BERNAT.

Witnesses:
JOSEPH GARRIEU,
HENRY PHILLIPS.